United States Patent Office 3,573,038
Patented Mar. 30, 1971

3,573,038
POROUS FORMED CATALYST BODY AND PROCESS FOR ITS PRODUCTION
Margarete Jung, Kelkheim, and Hans von Doehren, Frankfurt am Main, Germany, assignors to Varta Aktiengesellschaft, Frankfurt am Main, Germany
Filed Oct. 10, 1966, Ser. No. 585,548
Claims priority, application Germany, Oct. 9, 1965, V 29,493; Mar. 25, 1966, V 30,711
Int. Cl. B22f 1/00
U.S. Cl. 75—211  23 Claims

ABSTRACT OF THE DISCLOSURE

Catalyst powders, such as platinum, palladium or Raney metals, are rendered insensitive to air or oxygen by treatment with an oxygenated chlorine, bromine or iodine compound, such as potassium or sodium iodate, chlorate or bromate. The powder obtained is essentially hydrogen-free, non-pyrophoric and reactivatable. The powder may be molded by heat and pressure to a formed porous body.

---

Figure 1:
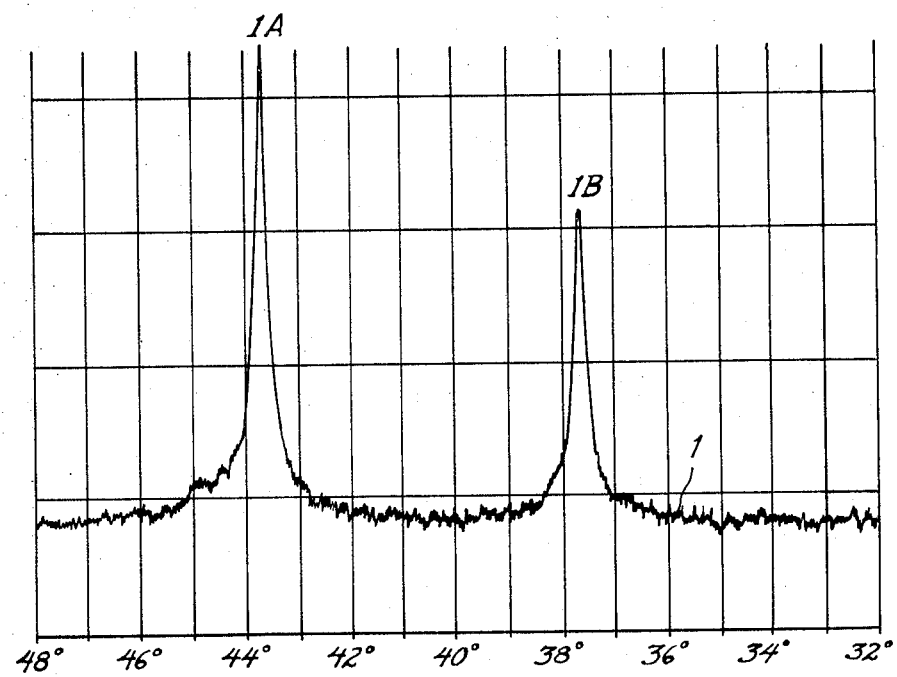

The present invention relates to molded or formed catalyst bodies and more specifically to hydrogen-transfer electrodes which are inert to atmospheric oxygen and which can be stored in the presence of atmospheric oxygen without detriment to their catalytic activity. More particularly, the invention relates to non-pyrophoric, heat and pressure formed or shaped, sintered catalytic bodies and to a process of making them.

It is known to protect catalysts which are sensitive to oxygen by storing them after their manufacture or activation submersed in liquids, such as in water, alkali hydroxide solutions, alcoholic solutions, liquid hydrocarbons or liquid oils. It has also been proposed to incorporate the catalysts in liquids which solidify upon cooling, such as fatty alcohols.

Recently, it has been proposed to preserve and protect such catalysts which are sensitive to air or to atmospheric oxygen, especially Raney-metal catalysts by impregnation of the catalyst with high boiling alcohol which are liquid at room temperature and which are soluble in water or aqueous alkali hydroxide solutions. The excess of the alcohol is thereafter removed. This method of preservation makes it possible to store also catalyst powders in contact with air.

In the meantime, however, it has been found that the further processing of catalysts which have been treated in this manner is difficult. The complete removal of the protective agents is not easy. There is a tendency for the retained traces of the protective agents to block especially the active centers of the catalyst body. It is furthermore not possible to treat and process the catalysts in the usual manner because they have regained their sensitivity to air after the removal of the protective agents. This disadvantage is particularly significant when it is intended to further manufacture the catalysts into electrodes. Thus, in the past it has not been possible to incorporate activated Raney-metal catalysts or such other metal catalysts which were obtained by thermal decomposition of metal compounds in a reducing atmosphere into electrode skeletons without risks and without irreversible damage to the catalytic properties.

An important contribution to the solution of these problems is described in copending application Ser. No. 564,489, filed June 30, 1966, now abandoned, which discloses the treatment of catalysts in such manner that they lose their sensitivity toward the oxygen of the air without losing the property of being reactivated by a simple treatment after their further processing or use. This is accomplished by removing the bound hydrogen from the catalyst by contacting them with chemical compounds which are capable of taking up the hydrogen, with later readsorption of the hydrogen into the catalyst at the time of its intended use. The removal of the hydrogen is effected under certain conditions so that the active centers of the catalyst are preserved.

The treatment of the active catalysts with peroxy compounds or with organic nitro compounds was found to be particularly suitable for the removal of the hydrogen without detriment to the later catalytic activity. Other oxygen-containing compounds, such as chromic or nitric acid or their salts was found likewise suited for this purpose.

It has also been known for some time to deactivate the catalyst by the electrochemical reaction of the hydrogen contained in the catalyst. However, this process is applicable only in practice to compact electrically conducting bodies, such as formed electrodes which contain a hydrogenating or dehydrogenating catalyst. Generally, this process cannot be used with catalyst powders. Commercially, it is however especially important to deactivate or to passivate catalyst powder at least for the time during which it is being processed and formed into the catalyst bodies and electrodes.

It is also less complex to activate fine powders than to activate the compact, molded bodies made from these fine powders. The mechanical strength of such compact bodies is greatly decreased by the application of activating and reactivating treatments because the catalyst particles making up these bodies are subject to changes in volume in the course of these treatments. It is also noteworthy that dissolving and impregnating treatments can be carried out more conveniently and faster with powders than is the case with compact, porous bodies preformed from the powder.

It was found, in connection with the above mentioned process of chemically passivating hydrogen-transfer catalysts that foil-like catalyst bodies can be made by cold pressing from the deactivated catalyst powder. These foils were found to be suitable for short term use as gas consumption electrodes and for use in low pressure fuel cells and in electrodialysis equipment after reintroduction of the hydrogen by electrochemical or chemical means. However, because of their lack of mechanical stability the reactivated catalyst foils were not suited for use in electrolytic equipment particularly at operations at higher temperatures, nor as the negative electrodes in rechargeable batteries. In the various use tests, it became apparent that the original degree of catalytic activity was not fully recovered and that the strength and stability of the cold pressed catalyst bodies was insufficient for technical and commercial use.

On the other hand, it was known that with the low-temperature catalysts, i.e. catalysts which are intended to be used in a temperature range between about −30° C. and +150° C., the fissures in the lattices increasingly tended to close themselves by recrystallization as the processing temperatures increased. The manufacture of this type of catalysts was therefore intentionally carried out at as low a temperature as is possible in order not to damage the specific catalyst structure by subjecting the catalysts to more heat than was thought necessary.

It is evident that in view of this state of the prior art, there was a need for and it was completely unexpected to find in accordance with the present invention that certain catalyst powders which are normally used for hydrogen-transfer reactions below 200° C. can be readily formed into high quality, molded catalyst bodies with the application of high pressures and high temperatures without damage to the catalyst. The catalyst powders used have the hydrogen, desirably all of it, removed from their active centers prior to subjecting them to the molding conditions. The resulting shaped passivated catalytic bodies are still non-pyrophoric.

The shaping step is preferably carried out at an elevated temperature, usually in a range of 400° C. to 600° C. with correspondingly high pressures, or, if desired, the pressing may be carried out at somewhat lower temperature, e.g. in the range of 420° C. to 460° C. with a subsequent sintering step at higher temperatures, e.g. at temperatures up to 600° C. or higher. The porous, sintered body obtained in this manner is inert to oxygen and can be used, after reintroduction of the hydrogen as catalyst for hydrogen-transfer in chemical reactions, and especially in fuel cells or fuel cell batteries. Generally, it is recommended to imbed the catalyst powder in a supporting skeleton of another material, both materials being preferably of about equal volume in order to greatly enhance the mechanical stability and in order to save the usually more valuable catalyst material.

In accordance with the foregoing, the present invention provides porous, metal-containing sintered bodies which are inert to oxygen, i.e. non-pyrophoric, and which are, after reactivation with hydrogen useful as hydrogen-transfer catalysts and especially as hydrogen electrodes in fuel cells at temperatures below 200° C. The sintered catalyst bodies are characterized in that substantially no hydrogen is present in the catalytically active centers. The most preferred catalyst bodies of the invention are those which have been produced from a passivated catalyst powder in which essentially no hydrogen is present in the catalytically active centers prior to the molding and sintering operation.

The removal of the hydrogen from the activated particulate hydrogen-transfer catalyst may be advantageously affected by a treatment with higher valent soluble bromine or iodine compounds or oxygen containing compounds of chlorine; at least the final phases of hydrogen removal are advantageously affected by these agents after initial use of one of the other proposed compounds for the hydrogen removal. Desirably, there are used in this embodiment of the method the oxygen-containing acids of bromine or iodine or chlorine and/or the salts of these acids the soluble chlorates being most preferred.

It is most surprising that according to the invention the compounds containing chlorine have been found useful in the passivation of catalyst material since in prior art chlorine has been known to permanently impair the catalytic activity of hydrogen transfer catalysts. Solutions containing sodium chlorate, $NaClO_3$, are preferable as passivating solutions since this compound is available at considerably lower expense than other useful compounds.

Advantageously, the deactivated catalyst body may contain a filler material which is soluble with the development of hydrogen gas. Alternatively, the deactivated catalyst body may contain a filler material which can be readily removed by dissolution without the liberation of a gas. Either type of filler material is advantageously used as particulate material having a diameter in the range from about 0.01 to 1.5 mm. The said filler material is beneficially employed in a proportion which amounts to from 5 to 40% by weight.

The process of the invention for making the sintered porous, passivated catalytic bodies comprises the step of forming under the application of pressure and heat a coherent catalyst body to the desired form from a powder of a hydrogen-transfer catalyst, which is sensitive to air per se and from which the hydrogen sorbed in the particles has been removed by suitable treatment so as to passivate the catalytically active particles. One embodiment of the process comprises the steps of first passivating a catalytically active hydrogen-transfer catalyst by the removal of the hydrogen from the catalyst particles and thereafter the step of molding under pressure and heat the inactivated catalyst particles into a desired shape with simultaneous or subsequent sintering of the particles.

Instead of using an individual passivated catalyst powder as the starting material one may also use a mixture of two or more such powders. The passivated catalyst powder may be mixed prior to its forming with a powdered material which is capable of increasing the mechanical strength of the sintered body to be formed and/or a powdered material which is capable of producing part of the porosity and which is adapted to produce large pores of great diameter, said powdered additive materials being adapted to be removed from the formed and sintered catalyst body prior to its use.

Most advantageously, the powdered hydrogen-transfer catalyst is provided with a promotor such as copper, mercury, silver or cadmium, desirably prior to the forming operation. These metals promote the stability to deactivation through heating or to poisoning and accelerate reactivation and allow for quick recovery of the electrodes in case of breakdown. The promotors are desirably precipitated uniformly on the surface of the individual particles of the catalyst powder, thereby resulting in uniform distribution of the promotors in the parts of the layer which are later on catalytically active. This is in contrast to the case of the electrodes of the prior art wherein the promotors have been applied to and incorporated into the preformed electrode. It is also beneficial to contact the particulate hydrogen-transfer catalyst, after the removal of the hydrogen but prior to the application of heat, with a higher valent soluble bromine or iodine compound, and especially the oxygen-containing acids of bromine or iodine or the soluble salts thereof, the soluble iodates such as potassium or sodium iodate being preferred.

In accordance with the invention the inactivated catalyst powder is advantageously mixed with a skeleton-forming amount of material prior to the forming with application of pressure and heat. Preferred skeleton materials are metal powders which are not soluble in the electrolyte and/or carbon powder. If desired, a powder of a synthetic high molecular weight polymer, preferably one which is electrically conductive may be admixed to the inactivated catalyst powder prior to the forming or molding with the application of pressure and heat. Such polymer are known and include, for instance, polar vinyl and vinylidene unsaturated polymers such as polyvinyl chloride, polymethyl methacrylate, polyacrylonitrile, polyamides and non-polar polymers such as polyethylene and polystyrene and others. It is also often advantageous to admix with the inactivated catalyst powder a metal and/or metalloid such as magnesium, calcium, zinc, boron, aluminum or silicon which is capable of taking up oxygen and of dissolving with liberation of hydrogen.

If it is intended to produce the shaped, porous sintered body by pressing with a subsequent separate sintering step, it is often desirable for better porosity in the finished body to admix to the inactivated catalyst powder a material which volatilizes upon the application of heat, such as ammonium carbonate or citric acid. If the pressing and sintering are to be carried out in one step, i.e. if the molding of the catalyst body is to be effected by hot pressing, it is preferred for improved porosity to admix to the inactivated catalyst powder a material which is not volatile at the temperature employed in the hot pressing and which can subsequently be removed simply by dissolving it out, such as an alkali-metal carbonate or an alkali metal chloride.

Figure 2:
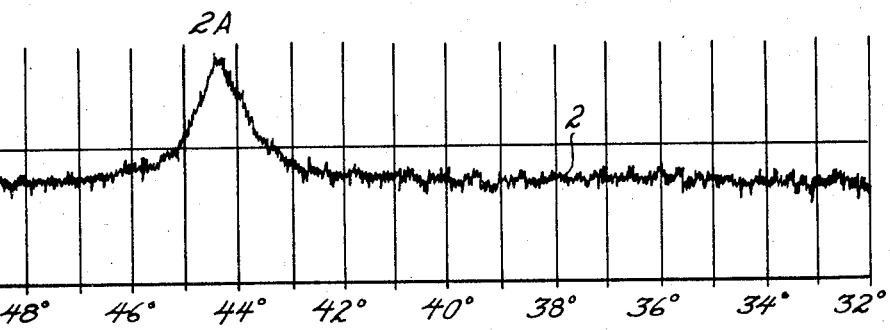

The attached FIGS. 1 and 2 represent X-ray diagrams of passivated Raney-nickel powders.

The invention of the present application thus provides the key for incorporation of any of the known hydrogen-transfer catalyst into a shaped porous catalyst body or into shaped electrodes of high strength and stability by the use of the new principles or embodied in the products and process of the invention. In addition, the invention permits the incorporation into the porous strong catalyst bodies of any desired new hydrogen transfer catalyst. The invention makes it also possible to produce passivated catalyst powders as a starting material in large volume batches and to store this material over long periods of time without detriment to the properies and usefulness of the final molded product, and their subjecting them to the process of the invention.

The practice of the invention is in no manner restricted to the use of the air and oxygen sensitive Raney metals and the alloys of Raney metals. The invention can be successfully practiced with any of the hydrogen-transfer catalysts, which are active at relatively low temperatures and pressures. Such catalysts include those which contain noble metals such as platinum or palladium as well as the metals nickel, cobalt and iron in their Raney form, including also the Raney multiple alloys which can be obtained, for instance, by the addition of titanium, chromium or vanadium in amounts of 0.1 to 10% by weight to the regular Raney-metal or Raney-alloys. Such Raney alloys are described in detail, for instance, in Austrian Pat. No. 206,867. Further examples of useful hydrogen-transfer catalysts are platinum black and palladium black which may be deposited in amounts of 0.01 to 0.5% by weight on a carrier material which is insoluble and inert to the electrolyte to be used, such as carbon, barium sulfate, aluminum oxide or kieselguhr. Other suitable hydrogen-transfer catalysts are exemplified by nickel catalysts which have been obtained by the decomposition of the formate, carbonate, oxalate or hydroxide of nickel, as well as catalysts which comprises nickel chromite and those comprising nickel boride or a mixture of nickel borides as they are described e.g. in German patent disclosure DAS 1,202,255. Other suitable catalysts are those which contain a precipitate of cobalt with small amounts of thorium on kieselguhr as the carrier material.

The deactivated or passivated particulate catalyst material which is used in the production of the molded porous catalyst bodies of the present invention may be obtained in various ways. It may be made by a process as it is described in copending application Ser. No. 564,489, which is incorporated herein by reference.

In accordance with the process of the present invention the pressures and temperatures used in the molding of the catalyst bodies or electrodes from the passivated catalysts may vary within certain limits. These variables depend primarily on the nature of the catalyst and/or carrier used and on the nature of the skeleton material, if one is employed. The pressures may be as high as 5 T./cm.$^2$ or more, with a range of the pressure from 0.3 to 2 T./cm.$^2$ being satisfactory for most of the skeleton materials. With some skeleton materials, and especially with plastics pressures in the lower range of 0.5 to 1 T./cm.$^2$ are often preferred. The optimum temperature employed in the molding may likewise vary within certain limits. If a separate sintering step is applied, especially in the presence of a metallic skeleton material, the pressing may be carried out at or about room temperature. If it is desired to mold the catalyst bodies or electrodes by hot pressing, temperatures in the range from 400° to 600° C. were found to be acceptable with most catalyst materials and with most metallic skeleton materials. If plastics are used as skeleton material or as a binder, the preferred temperatures for the pressing are dependent on the level of the pressures applied in the pressing and on the melting or softening point, respectively, of the plastic used. Temperatures in the range from 120° to 180° C. were found to be most satisfactory in most instances.

If a separate sintering step is applied, the compressed material is heated to a temperature high enough to produce a sintering effect. Of course, the preferred sintering temperatures depend primarily on the nature of the catalyst and of skeleton materials. With most materials, sintering temperatures in the range from 400° to 600° C. were found to be satisfactory. The catalytic reactivation by sorbtion of hydrogen can be concurrent with or subsequent to the sintering step.

One of the advantages of the present catalytic bodies is that when compared with the double-skeleton-catalyst electrodes of the prior art (U.S. Pat. 2,928,891), the catalyst bodies of the present invention contain an appreciably increased proportion of the catalyst material without detriment to the desired strength and stability of the catalyst body. In the double-skeleton-catalyst electrodes of the prior art it was necessary to admix for each part by weight of a Raney-nickel alloy (containing 43% by weight of nickel) 1.2 part by weight of carbonyl nickel. In the catalyst bodies or elecrtodes of the present invention, it is possible to use for each part by weight of carbonyl nickel one part by weight of Raney-nickel which can consist of 100% of nickel. The increase of the content of active Raney-nickel in the reactivated catalyst bodies and in the electrodes of the present invention provides a much greater range of reaction in the electrochemical reaction of gases or liquids and greatly reduces at the danger of poisoning of the catalyst bodies or electrodes.

The process for the production of the double-skeleton-catalyst electrodes of the prior art from a Raney-alloy involves also the disadvantage that the aluminum contained in the Raney-alloy diffuses during the hot-pressing or sintering into the skeleton material. This results in a reduction of the content of the inactive component in the Raney-alloy. On the other hand, in the reaction of the Raney-alloy with the carbonyl nickel skeleton material considerable amounts of NiAl are formed, which cannot be activated to Raney-nickel. This reaction has the further undesirable effect, that primarily those areas are blocked in the pores of the electrodes, which are electrochemically important.

In contrast to this, the particulate skeleton material in the electrodes or catalyst bodies of the present invention cannot react with an inactive component of a Raney-alloy. This criterion is important and permits differentiation of the electrodes of the present invention from those of the prior art.

A further advantage of the present invention resides in the procedure of manufacturing the catalyst bodies. In accordance with the process of the invention, the catalyst can be activated prior to the production of the catalyst bodies or electrodes when it is still in a finely particulate state. A Raney-alloy powder, for instance, can be fully activated by the treatment with a solvent for the inactive component, depending on the particle size of the powder within about 30 to 100 minutes. A similar treatment of a preformed catalyst body or electrode which is 4 mm. thick requires even at high temperatures and with the addition of complexing agents for the inactive component, 6 to 10 days. As can readily be seen from the preceding comparison, the process of the invention is far superior to the process of the prior art by providing a great saving in time and by permitting a much more economical manufacture of the catalyst bodies and electrodes. If in the process of the present invention, the metallic powder of the skeleton material is the same metal as that used in the catalyst, there is obtained extremely strong structures which do not burst even at double the operating pressures which result in the formation of cracks in the double-skeleton catalyst electrodes of the prior art.

The following examples are not a limitation of the invention.

EXAMPLE 1

500 g. of a Raney-alloy which contained 50% by weight nickel and 50% by weight aluminum and which had a particle size of 10$\mu$ to 15$\mu$ were incorporated into 6 N KOH, which contained in addition 10 g./l. of potassium sodium tartrate as a complexing agent for the dissolved aluminum.

After the completion of the initial rapid development of hydrogen, a solution of 1.25 g. copper chloride ($CuCl_2 \cdot 2H_2O$) in water was slowly added in small portions with rapid stirring. The copper deposited thereby is in finest distribution on the active centers of the Raney-nickel. Thereafter, the suspension was heated with continuous stirring to the boiling point and the heating was continued until the development of hydrogen had completely ceased, whereupon the Raney-nickel was isolated from the solution.

The particulate Raney-nickel was then placed into a container and covered by a solution of 122 g. potassium iodate in water. The solution was stirred for 20 hours, at which time there was no further noticeable reduction of the iodate content of the solution. The iodate solution was then decanted and the passivated, particulate Raney-nickel was then washed in vacuo until it was free from alkali. Thereafter, it was separated by suction and dried. There was no heat generation.

One part by weight of the deactivated dry powder was slowly mixed, in a cube mixer, for 24 hours with 1.3 parts by weight of carbonyl nickel. The mixture was then filled into a mold and compressed at a pressure of 4 T./cm.² at room temperature. The molded structure was thereafter sintered at 550° C. for 30 minutes in a stream of hydrogen gas. The catalytically active electrode obtained in this manner could be stored for any desired length of time without any special precautions to prevent inactivation.

EXAMPLE 2

500 g. of a Raney-alloy, containing 50% by weight nickel and 50% by weight aluminum and having a particle size of $10\mu$ to $15\mu$ were activated in 6 N KOH and the particulate Raney-nickel was then passivated without the addition of a promoter by the immersion in a potassium iodate solution as described in Example 1.

After washing and drying, en electrode was formed by pressing from a mixture of the dry, particulate passivated Raney-metal with finely particulate carbonyl nickel, with the subsequent sintering of the electrode body at 550° C. in the manner described in Example 1. The electrode is catalytically active and can be stored without special precautions.

EXAMPLE 3

A Raney-alloy, consisting of 48% by weight nickel, 3.0% by weight vanadium and 49% by weight aluminum were activated in the manner described in Example 1. The particulate, activated Raney-nickel was then washed twice with portions of aqueous potassium hydroxide to remove as much as possible of the aluminate. Thereafter, the catalyst was washed six times with rapid stirring with five liters each of distilled water. The wet powder was then slurried in three liters of water.

A saturated calomel electrode was then suspended in the aqueous medium as reference electrode and a 3% aqueous solution of hydrogen peroxide was thereafter added with the control of the potential until the original potential had been made positive by 200 mv. The supernatant solution was then removed by suction and aqueous potassium iodate solution were added to and left for 15 hours in contact with the particulate activated catalyst material. The after treatment and drying of the passivated catalyst powder were carried out in accordance with the procedure described in Example 1.

One part by weight of the dried, passivated nickel powder was mixed with 1.3 part by weight of light weight carbonyl nickel powder having a particle as described in Example 1. The mixture was filled into a mold which contained a layer of light weight carbonyl nickel which serves as the cover layer in the electrode. Onto the spread-out layer of the passivated, dry nickel catalyst powder were then filled 5 g. of a mixture of 75% by weight carbonyl nickel and 25% by weight potassium chloride having a particle size of about $200\mu$ to $300\mu$. The electrode was hot shaped and pressed at 450° C. and a pressure of 0.5 T./cm.² giving a stable catalytic body.

EXAMPLE 4

A fine nickel powder obtained by thermal decomposition of nickel oxalate, was stirred into a solution of aqueous potassium bromate. The suspension was permitted to stand until the concentration of the potassium bromate did not decrease further. The passivated nickel powder was then filtered off, washed and dried.

One part of the dried, passivated nickel powder was then thoroughly mixed with 0.28 part by weight particulate active carbon and with 0.015 part by weight of polyethylene. The mixture was molded into an electrode by pressing at 160° C. under pressure.

The attached drawings show two curves of which the curve designated FIG. 1 represents an X-ray diagram of a Raney-nickel powder which has been completely freed from hydrogen with hydrogen peroxide only. The curve designated FIG. 2 represents an X-ray diagram which was taken under comparable conditions from a Raney-nickel powder which has been partially deactivated by the use of a hydrogen peroxide solution and in which the last traces of sorbed hydrogen have been removed by means of an aqueous solution of potassium iodate in a manner similar to that described in Example 3.

The comparison of the two curves shows clearly that the peaks designated by 1A and 1B in FIG. 1 are not present in FIG. 2. The peaks 1A and 1B are indicative of the presence of nickel oxide. The mound at 2A in FIG. 2 indicates on the other hand that the deactivated nickel is present in a highly loosened cubic form. These curves assist in identification of the nature of the starting material used in process of the invention.

The passivated, shaped catalyst bodies provided by the present invention contain the catalytically active metal in an inert form and are inert to atmospheric oxygen. They may be stored for any length of time without the need for taking special precautions and without detriment to their later activity.

The passivated catalyst bodies can be conveniently activated at any desired time prior to their intended use by the introduction of hydrogen into the structure of the catalytically active material. This may be achieved in various ways, e.g. by simply contacting the catalyst body or electrode with gaseous hydrogen at room temperature, at atmospheric or elevated temperatures. It is preferred, however, to load the deactivated catalyst body or electrode with hydrogen at elevated temperatures. In accordance therewith, the loading or reactivation, with hydrogen is preferably carried out at a temperature ranging from 30° C. to 100° C., with a temperature in the range from 50° C. to 90° C. being preferred. In the case of electrodes, it was found to be of advantage to subject the electrode to an electrical cathodic load while it is being loaded with hydrogen.

The hydrogen may be gaseous hydrogen, or it may be nascent hydrogen as it is obtained, e.g. by the dissolving of a hydrogen-liberating compound. In this case, the hydrogen-liberating compound is dissolved in the presence of the passivated catalyst body or electrode of the invention. Such hydrogen-liberating compounds may be incorporated in the catalyst body or electrode during the shaping thereby releasing their hydrogen when subjected to heat and allowing it to be sorbed by the catalyst.

EXAMPLE 5

A fine nickel powder obtained by thermal decomposition of nickel oxalate, was stirred into an aqueous solution of sodium chlorate. The suspension was permitted to stand until the concentration of the sodium chlorate did not decrease further. The passivated nickel powder was then filtered off, washed and dried.

One part of the dried, passivated nickel powder was then thoroughly mixed with 0.28 part by weight particulate active carbon and with 0.015 part by weight of polyethylene. The mixture was molded into an electrode by pressing at 160° C. at a pressure of 0.3 T./cm.$^2$.

We claim:

1. The process for chemically converting a hydrogen-transfer catalyst powder which is catalytically deactivated upon exposure to oxygen to a passivated, catalytically reactivatable non-pyrophoric, hydrogen-transfer catalyst powder which is free of hydrogen
    which comprises exposing the hydrogen-transfer catalyst powder to a treating agent selected from the following: an oxygenated soluble chlorine, bromine or iodine compound, and
    obtaining a non-pyrophoric powder which is catalytically reactivatable, the active centers of which are essentially free of hydrogen.

2. The process of claim 1 which is carried out until substantially no further reduction of the catalyst powder takes place.

3. The process of claim 1 wherein the catalyst powder to be treated is immersed in an aqueous solution of the treating agent.

4. The process of claim 1 wherein the treating agent is a polyvalent oxgen-containing acid of iodine, bromine or chlorine or the salt thereof.

5. The process of claim 4 wherein the treating agent is a water-soluble chlorate.

6. The process of claim 4 wherein the treating agent is a water-soluble iodate or bromate.

7. The process of claim 4 wherein the treating agent is potassium or sodium iodate, chlorate or bromate.

8. The process of claim 1 in which the resulting non-pyrophoric catalyst powder is dried, and then molded under application of heat and pressure to a formed, porous, non-pyrophoric, catalytically-activatable body.

9. The process of claim 8 wherein the molded body is catalytically activated by exposure to hydrogen.

10. The process of claim 1 wherein the hydrogen-transfer catalyst powder is a metal powder, the metal being platinum, palladium, or Raney-nickel, Raney-cobalt, Raney-iron or a Raney-alloy thereof.

11. The process of claim 10 wherein the catalyst powder to be treated is a Raney-metal.

12. The process of claim 11 wherein the Raney-metal is a Raney-nickel powder.

13. The process of claim 1 which comprises the step of exposing the resulting powder to an oxygen-containing atmosphere without loss of the capacity for being catalytically reactivated by treatment with hydrogen.

14. The process of claim 1 wherein the powder is treated with an oxygenated soluble bromine or iodine treating agent after the removal of the main portion of the hydrogen with a treating agent other than said agents stated above.

15. The process of claim 8 in which the pressure ranges from 0.3 T./cm.$^2$ to 5 T./cm.$^2$.

16. The process of claim 8 in which the temperature ranges from 400° to 600° C.

17. The process of claim 8 in which the temperature and pressure range from 400° to 600° C. and from 0.3 T./cm.$^2$ to 5 T./cm.$^2$, respectively.

18. The process of claim 8 in which the activation of the catalyst is carried out after formation of the body.

19. The process of claim 8 wherein the passivated catalyst is treated with iodine or bromine before the shaping step is carried out.

20. The process of claim 13 wherein the powder is exposed to heat and pressure concurrently with exposure to the oxygen-containing atmosphere.

21. The process of claim 20 wherein the formed body is catalytically activated by exposure to hydrogen.

22. The process for chemically converting a hydrogen-transfer catalyst pyrophoric metal powder which is catalytically deactivated upon exposure to oxygen to a passivated, catalytically reactivatable, non-pyrophoric, hydrogen-transfer catalyst metal powder which is free of hydrogen, the metal being platinum, palladium, Raney-nickel or Raney-cobalt, Raney-iron or a Raney-alloy thereof
    which comprises immersing the hydrogen-transfer catalyst metal powder in an aqueous solution of hydrogen peroxide, removing it therefrom, immersing the powder in an aqueous solution of an oxygenated soluble chlorine, bromine or iodine compound or salt thereof,
    separating a non-pyrophoric powder which is catalytically reactivatable, the active centers of which are essentially free of hydrogen, then molding said powder under application of heat and pressure to a formed, porous, non-pyrophoric, catalytically activatable body.

23. The process of claim 22 wherein the aqueous solution is potassium iodate.

References Cited

UNITED STATES PATENTS

| | | | |
|---|---|---|---|
| 2,977,327 | 9/1958 | Raney | 252—472 |
| 3,111,396 | 11/1963 | Ball | 75—222 |
| 3,139,408 | 6/1964 | Tumer | 252—472 |
| 3,170,785 | 2/1965 | Phillips | 148—126 |
| 3,226,263 | 12/1965 | Oswin | 75—222X |
| 3,291,642 | 12/1966 | Jung | 136—120X |
| 3,305,403 | 2/1967 | Corso | 136—120 |
| 3,359,099 | 12/1967 | Lindstrom | 75—222X |

FOREIGN PATENTS

| | | | |
|---|---|---|---|
| 721,372 | 11/1965 | Canada | 136—120 |
| 740,511 | 8/1966 | Canada | 136—120 |

CARL D. QUARFORTH, Primary Examiner

A. J. STEINER, Assistant Examiner

U.S. Cl. X.R.

75—.5, 222; 136—120